May 21, 1968     I. JEPSON ET AL     3,384,195
ELECTRIC FRYING PAN
Filed April 15, 1955     4 Sheets-Sheet 4
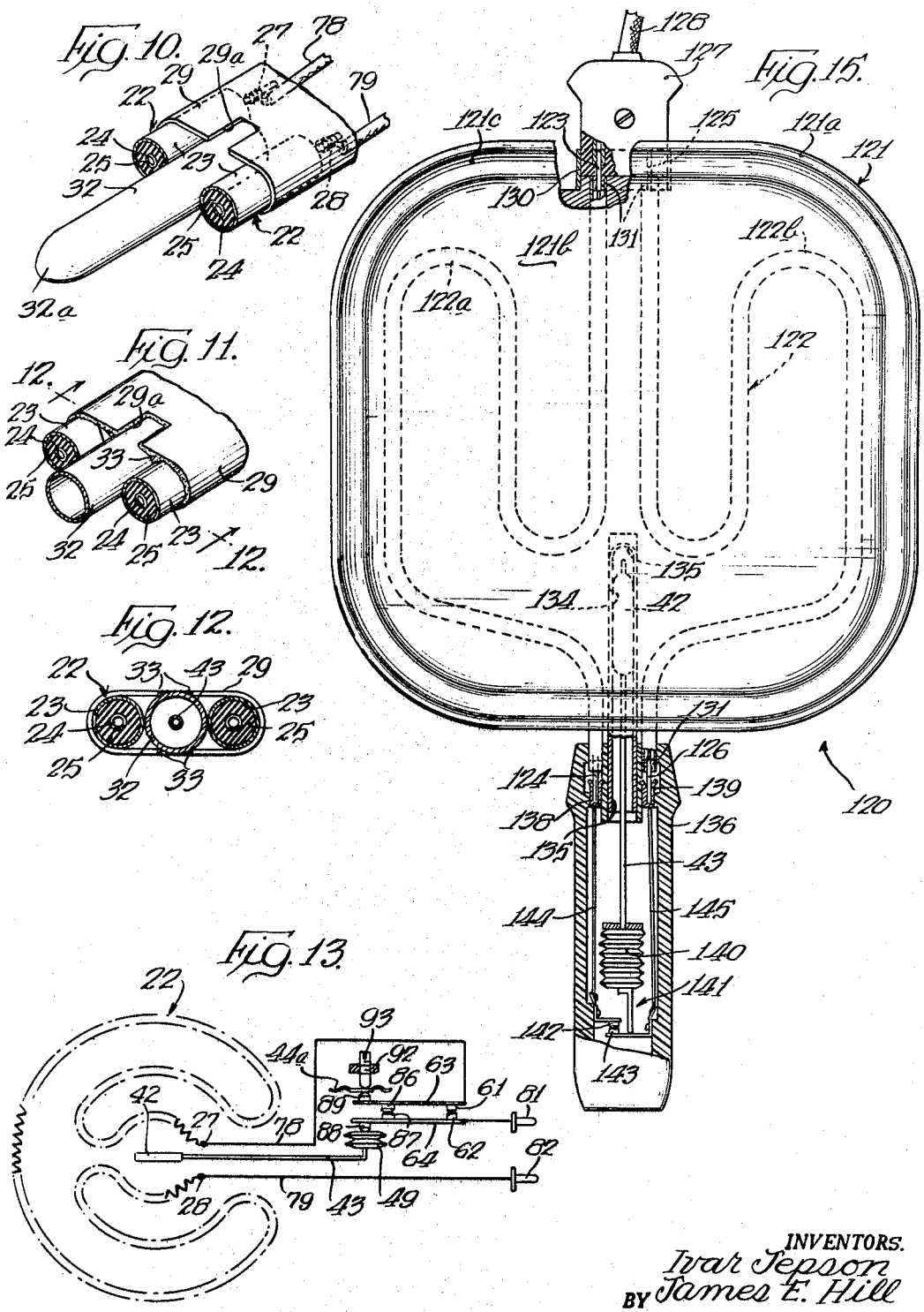
INVENTORS.
Ivar Jepson
BY James E. Hill
Mason, Kolehmainen, Rathburn & Wyss
Attys.

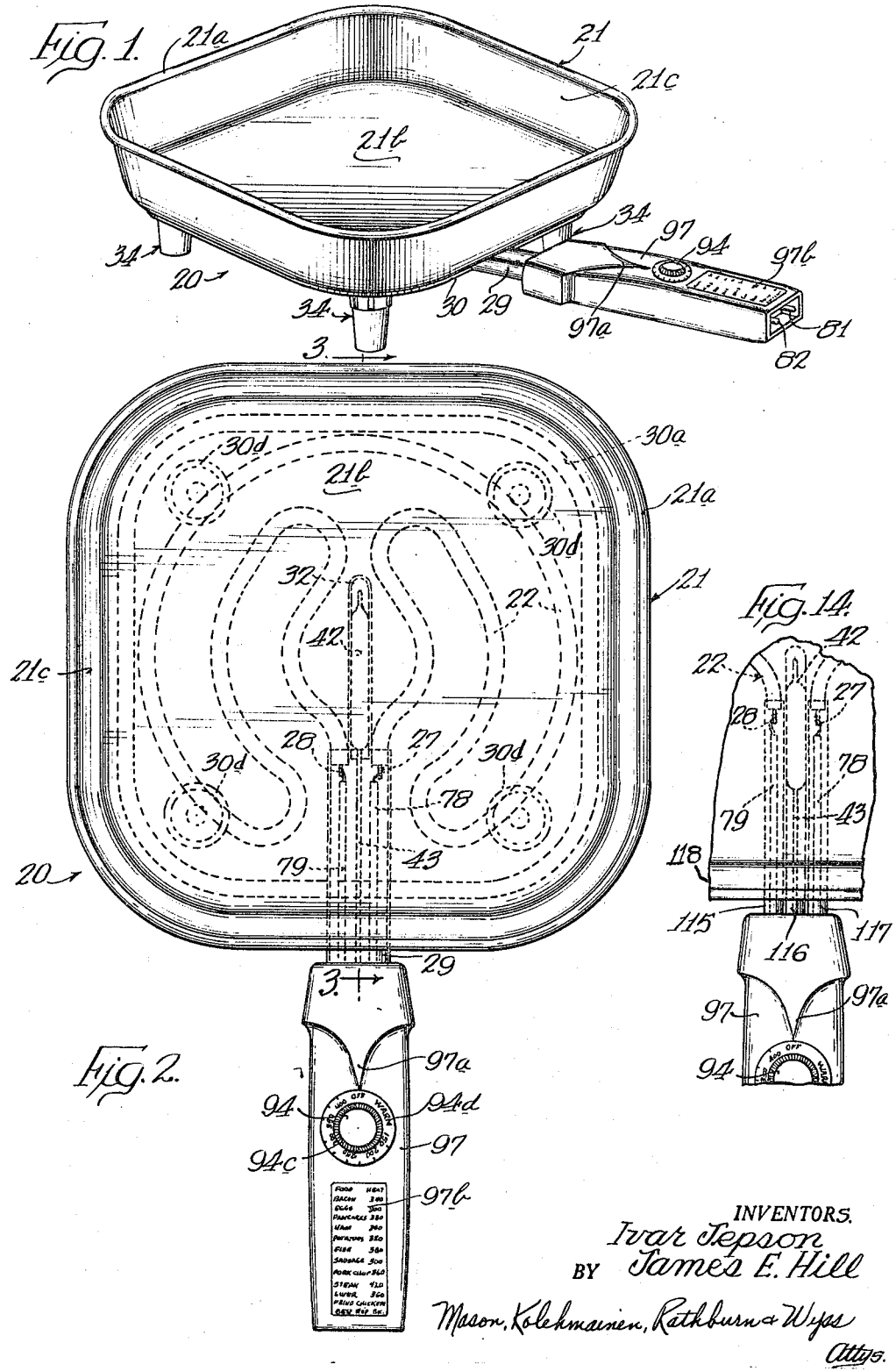

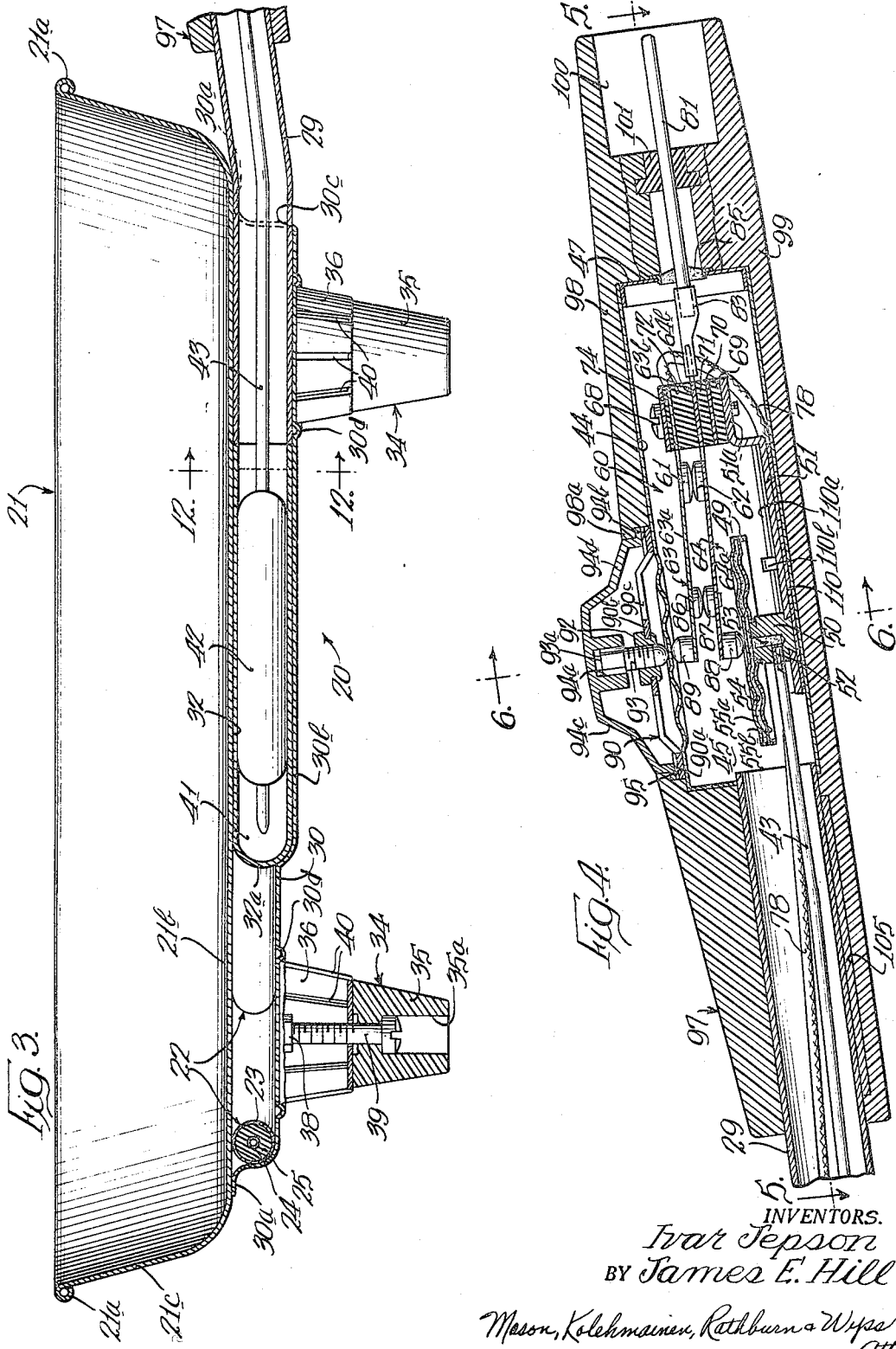

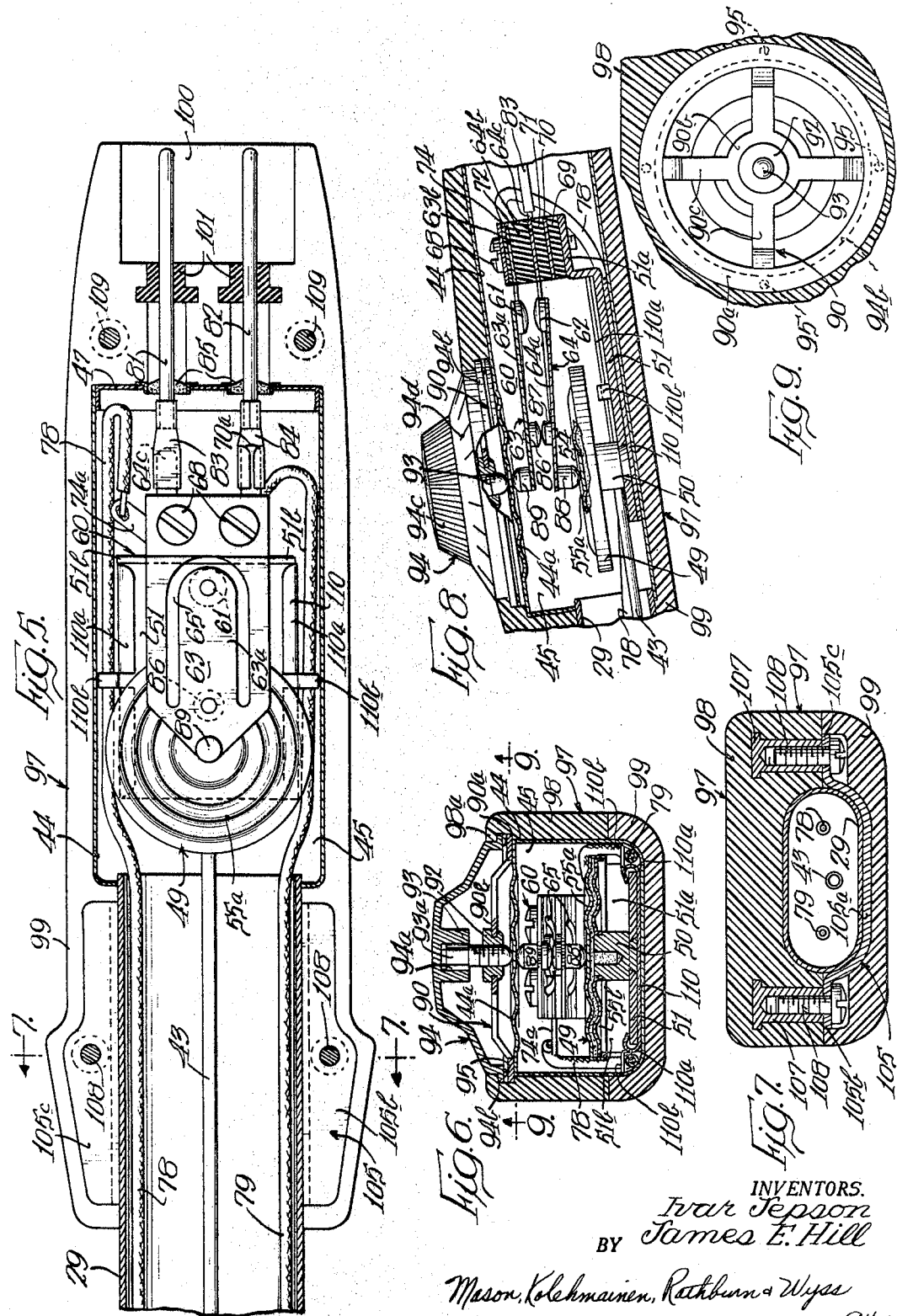

United States Patent Office 3,384,195
Patented May 21, 1968

3,384,195
ELECTRIC FRYING PAN
Ivar Jepson, Oak Park, and James E. Hill, Chicago, Ill., assignors to Sunbeam Corporation, Chicago, Ill., a corporation of Illinois
Filed Apr. 15, 1955, Ser. No. 501,652
18 Claims. (Cl. 219—442)

ABSTRACT OF THE DISCLOSURE

Electric frying pan including a container having an electric heating element in intimate heat exchange relationship with the bottom of the container. An elongated member defining a hermetically sealed chamber has one end thereof secured to the container and extends laterally therefrom with an insulating member secured to and enclosing a portion of the end of the member remote from the vessel to define a handle. A temperature sensing zone is provided in intimate heat exchange relationship with the bottom of the vessel and temperature sensing means are disposed within this chamber and adapted to be selectively adjusted by means wholly outside the hermetically sealed chamber. In one embodiment the handle and the temperature sensing element are removable as a unit from the vessel. The temperature sensing device includes an expansible bellows.

---

The present invention relates to an electric frying pan having automatically controlled heating means, and, more generally, to an electric cooking vessel with built-in heating means and automatic temperature control means therefor. Specifically, the present invention is an improvement on a copending Jepson application, Ser. No. 395,824, filed Dec. 2, 1953, now Patent No. 2,744,995, and assigned to the same assignee as the instant application.

The electric frying pan, as an extensively used cooking vessel in the home, is still in its infancy. Only a little over a year ago, applicants' assignee put on the market an electric frying pan built in accordance with the frying pan disclosed and claimed in the aforementioned copending Jepson application. In that short period of time, applicants' assignee has manufactured over one million of such electric frying pans. It is believed that the reason for this great commercial success is obvious, since a frying pan is an item that is considered to be a necessity in every home, and few, if any, kitchens in this country are without a frying pan. Prior to the invention of the aforesaid Jepson application, however, the common method of using a frying pan was to supply it with heat from either a gas or electric plate, which gas or electric plate is commonly associated with the well-known kitchen range. Although such kitchen ranges often are provided with automatic temperature control means for the associated oven, they have no automatic temperature control means for the surface units, as they are commonly called, and the housewife must adjust the heating of the surface unit to what she feels is the desired heating and hope that she is supplying about the right amount of heat. Unfortunately, the temperature of an open gas flame, for example, or the heat produced from an electric plate which may be one of the surface units of a kitchen range vary widely, depending upon the nature of the gas and the gas pressure in the case of a gas flame, or the voltage of the system in connection with the electric plate, as well as in dependence upon the settings of the controls for either gas or electricity. It will, furthermore, be appreciated that a variable which is difficult to control in cooking or frying with an ordinary kitchen range is the position of the frying pan or cooking vessel with respect to the heating zone. If the vessel is very close to the flame or electric resistance heater, obviously much faster heating will result than where a substantial space exists between the heat source and the cooking vessel. Cooking vessels are made of different materials and are of different thicknesses and sizes. As a result, when cooking or frying with an electric or gas range, it is difficult, if not impossible, to eliminate localized heating zones in a cooking vessel which might cause burning of the food in one case or insufficient cooking in another. It will be appreciated that open doors and windows as well as the conventional kitchen fan cause air currents which introduce further variables in heating by a flame or by an electric resistance unit, both of which are somewhat spaced from the vessel being heated. In the frying pan of the copending application, accurate heat control and efficient operation of a heating element incorporated as a unit with the cooking vessel is accomplished, with the result that the heating element is always in the same intimate heat exchange relationship with the portion of the heating vessel defining the cooking surface, and with the aid of a suitable control mechanism accurate control is possible.

The present invention relates to an electric frying pan or cooking vessel closely related to the arrangement disclosed in the above-mentioned copending Jepson application, including many of the desirable features thereof, particularly with respect to eliminating the difficulties in variables set forth above which are inherent in cooking or frying with the cooking vessel disposed above an ordinary gas or electric heat source as commonly employed in a kitchen range.

Moreover, as in the frying pan of the above-mentioned Jepson application, it is essential that, even with built-in heating means and built-in control means, it can be immersed in water for cleaning purposes without damage thereto. It will be apparent that a frying pan presents a cleaning problem, since food particles and grease tend to stick to the cooking surface. Prior to the invention of the above-mentioned copending Jepson application, electric frying pans or electric cooking vessels had not been designed so that the entire cooking vessel could be immersed in water for washing purposes. It would be desirable, therefore, to provide an electric cooking vessel with automatic control having all moving parts disposed in a completely sealed chamber, and which, moreover, dispenses with any gaskets or the like for sealing purposes.

Although many cooking vessels are manufactured by casting them from aluminum, which provides a satisfactory construction, it does present a problem of expense, since it is necessary to polish the cast cooking surface after the casting operation to insure a very smooth and satisfactory cooking surface. Where the pan construction is somewhat rectangular, as in the above-mentioned copending Jepson application, in order to provide more cooking surface, the polishing problem is somewhat increased by virtue of this rectangular configuration. Although the present invention is applicable to an electric frying pan having a cast cooking vessel portion, it also lends itself very well to an electric frying pan which may be made from metal stampings which permit a somewhat lower manufacturing cost with the elimination of numerous polishing operations.

Accordingly, it is an object of the present invention to provide a new and improved electric cooking vessel.

It is another object of the present invention to provide a new and improved electric frying pan having automatically controlled heat.

Still another object of the present invention resides in the provision of an electric frying pan having improved means for controlling the heat for perfect cooking, and eliminating the constant watching that was heretofore inherent in frying foods, and, furthermore, the provision of an arrangement in which the shortening is always at just the right temperature resulting in less grease absorption into the foods, with the end result that such foods are more flavorful by virtue of sealing in the natural juices and the like.

Still another object of the present invention resides in an electric frying pan overcoming the disadvantageous features of the prior art in which the cooking vessel portion can be constructed of metal stampings.

Still another object of the present invention resides in the provision of an electric frying pan with automatic temperature control means and embodying an improved waterproof construction which may be immersed in water for cleaning purposes without deleterious effect.

It is another object of the present invention to provide a thermostatically controlled electric frying pan in which no movable means of any kind are associated with the cooking vessel itself and all control means including all movable portions thereof are embodied within a hermetically sealed chamber devoid of gaskets or the like and included in the handle of the vessel.

Another object of the present invention resides in an electric cooking vessel with a removable handle, including in the removable handle all the necessary control means whereby the remainder of the vessel is readily immersible in a cleaning liquid.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of an electric frying pan or cooking vessel embodying the present invention;

FIG. 2 is a somewhat enlarged top plan view of the frying pan of FIG. 1;

FIG. 3 is a greatly enlarged sectional view taken on line 3—3 of FIG. 2 of the vessel portion and a small section of the handle with certain other portions thereof shown in section better to illustrate the details of the frying pan of the present invention;

FIG. 4 is a greatly enlarged longitudinal sectional view of the handle of the frying pan of FIG. 2 with the switch contacts in the closed or on position, FIG. 4 being effectively a continuation of the sectional view of FIG. 3;

FIG. 5 is a sectional view taken on line 5—5 of FIG. 4, assuming that FIG. 4 shows the complete structure;

FIG. 6 is a sectional view taken on line 6—6 of FIG. 4, again assuming that FIG. 4 shows the complete structure;

FIG. 7 is a sectional view taken on line 7—7 of FIG. 5, assuming that FIG. 5 shows the complete structure;

FIG. 8 is a partial view of FIG. 4 showing the control switch in the open or off position, and also showing certain elements in full in order better to illustrate the present invention;

FIG. 9 is a sectional view taken on line 9—9 of FIG. 6, assuming that FIG. 6 shows the complete structure;

FIG. 10 is a perspective view of a portion of the handle of the frying pan of the present invention to illustrate one step in the assembly operation thereof;

FIG. 11 is a view somewhat similar to FIG. 10 illustrating an immediately succeeding step in the assembly operation of the frying pan of the present invention;

FIG. 12 is a sectional view taken on line 12—12 of FIG. 3, assuming that FIG. 3 shows the complete construction, and is also a sectional view taken on line 12—12 of FIG. 11;

FIG. 13 is a schematic diagram of the electrical heating and control circuit of the cooking vessel of the present invention;

FIG. 14 is a partial view similar to FIG. 2 illustrating a modification of the present invention in which the present invention is applied to a frying pan of the cast vessel type; and FIG. 15 is a view similar to FIG. 2 illustrating another modification of the present invention with certain portions somewhat schematically illustrated.

Briefly, the present invention is concerned with an electric cooking vessel, and specifically a frying pan comprising a container or vessel having a rectangular configuration with rounded corners similar to the configuration of the vessel of the above-mentioned copending Jepson application. This vessel is preferably formed of an aluminum or other metal stamping, but, as will become apparent from the ensuing description, may also be made of cast aluminum or the like. A handle is secured to the frying pan, which handle preferably includes a tubular portion extending laterally away from the frying pan, which tubular portion accommodates conductors connected to a heating element associated in intimate heat exchange relationship with the bottom of the frying pan, and also accommodates a conduit, such as a capillary tube, interconnecting a bulb containing a suitable expansible fluid and an expansible diaphragm. This bulb is preferably in heat exchange relationship with the cooking vessel, while the diaphragm is in the handle therefor. All of the movable control elements are disposed within a sealed container which is devoid of any sealing gaskets. Thus, the frying pan may be wholly immersed in water for cleaning purposes. In another embodiment, a frying pan with a removable handle assembly is provided to facilitate cleaning with the handle and associated controls removed.

Referring now to the drawings, there is illustrated in FIGS. 1 to 13 an electric frying pan generally designated by the reference numeral 20. This frying pan is illustrated as comprising a shallow open top vessel or container 21 of a substantially rectangular configuration, thereby permitting one to cook more food in the same area as contrasted with the circular frying pans heretofore commonly employed. As illustrated in FIGS. 1, 2 and 3 of the drawings, the vessel or container 21 is substantially square in configuration except that the four corners are smoothly rounded to make cleaning a simple problem. Preferably, the vessel 21 is formed as a metal stamping from aluminum or other suitable metal which is a good heat conductor so as to insure uniform temperature throughout. Although in the preferred embodiment it is indicated that the vessel 21 should preferably be formed as a metal stamping, it will be appreciated that the vessel 21 could be cast from aluminum or the like in the manner of the frying pan of the aforesaid copending Jepson application. When formed as a metal stamping, the vessel 21 will have a rolled edge 21a around the upper periphery thereof, as best shown in FIG. 3 of the drawings. Also, when formed as a metal stamping, the vessel 21 will be formed as a separate unit and the other means described hereinafter will be secured thereto in a manner described in detail hereinafter.

For the purpose of heating the bottom of the vessel 21 to a uniform temperature, there is preferably provided a heating element 22, which heating element 22, in the event that the vessel 21 is cast of aluminum, is preferably cast therein within a suitable rib or the like. In the preferred embodiment, however, the heating element is formed in the shape of a sort of double U-shaped element, as is clearly indicated in dotted lines in FIG. 2 of the drawings, so as to supply heat uniformly over the entire area of the bottom surface of the vessel 21. The vessel 21 preferably comprises, in addition to the rolled rim 21a referred to above, a relatively flat bottom 21b and a shallow peripheral flange 21c integrally formed with the bottom 21b and the rolled rim 21a. The peripheral upstanding flange 21c is preferably flared outwardly slightly, and also the bottom 21b and the side walls 21c are preferably connected by a smooth curve, as shown in FIG. 3 of the drawings. The upper side of the bottom 21b defines the cooking surface, as will readily be understood by those skilled in the art.

The heating element 22, which obviously may have any other suitable configuration for subsequent attachment in intimate heat exchange relationship with the bottom 21b of the vessel 21, is preferably one of the well-known sheathed type heating elements, which conventionally comprise an outer metal sheath within which is disposed a suitable length of resistance wire, such, for example, as the resistance wire sold under the trademark "Nichrome," coiled in the form of a helix. As illustrated in FIGS. 3, 10, 11 and 12 of the drawings, the heating element 22 comprises sheath 23 within which there is disposed a coiled resistance wire 24. Surrounding the coiled resistance wire 24 within the sheath 23 is a refractory composition designated by the reference numeral 25 and commonly formed of fused magnesium oxide, which centers the resistance element and which, furthermore, is a good conductor of heat and yet an excellent electrical insulator. By having the configuration shown in FIG. 2 of the drawings, the ends of the heating element 22 which terminate in electrical terminals 27 and 28, respectively (see FIGS. 2 and 10 of the drawings), are disposed in parallel relationship and spaced relatively closely together so that they may be caused to enter a relatively small tubular handle or the like.

It will be appreciated that it is necessary to secure the heating element 20 in intimate heat exchange relationship with the bottom 21b of the vessel 21. To accomplish this and at the same time provide an arrangement whereby without any movable elements associated with the vessel a temperature sensitive mechanism may be associated with the vessel 21, there is first produced in accordance with the present invention a subassembly comprising the heating element 22, a tubular metal member 29 adapted to extend laterally from the vessel 21 to define a portion of a handle described in greater detail hereinafter, and a panlike member 30 for enclosing the heating element and giving the bottom of the vessel a pleasing appearance. In accordance with one embodiment of the present invention, the handle portion 29 is a tubular metal member which may be formed of a relatively poor conductor of heat such as stainless steel. As illustrated in the drawings, the tubular member 29 has a somewhat rectangular cross section with rounded corner of a configuration best shown in FIGS. 7, 10, 11 and 12 of the drawings. However, as will be apparent from the arrangement disclosed in FIG. 14, instead of the tube 29 being a single tube, it could be a series of spaced parallel tubes, the purpose of which will become apparent as the ensuing description proceeds.

In order to provide a completely sealed construction which will permit immersion within a washing liquid or fluid, the end of the tubular member 29 adjacent the vessel 21 is united with the heating element 22 and with a tubular member 32 to define a well or chamber for receiving a bulb containing an expansible fluid whereby the bulb may be in intimate heat exchange relationship with the vessel 21. As best shown in FIGS. 10, 11 and 12 of the drawings, the tubular member 29 has the walls thereof spaced so as to snugly receive therein the ends of the heating element 22 which terminate in the terminals 27 and 28. These ends are inserted for a distance within the adjacent end of the tubular member 29, as is best shown in FIG. 10. The upper and lower walls of the tubular member 29 adjacent the end beneath the vessel 21 are notched as indicated at 29a in FIGS. 10 and 11 of the drawings to receive therein a tubular member 32 which has an outside diameter preferably identical with the outside dimension between the top and bottom of the tubular member 29. This notch 29a is provided so that the tubular member 32 may be inserted into the tube 29 to the end of the notch 29a and will effectively define a continuation of the tube 29 with at least the upper and lower wall portions of the tubular member 32 being flush inside and outside with the upper and lower wall portions of the tubular member 29. The tubular member 32 is closed at the end remote from tubular member 29 as indicated at 32a, so that when the tubular member 29 is assembled with the heating element 22 and the tubular member 32 and the junctions of these members are sealed or brazed as indicated at 33 in FIG. 11 of the drawings, a completely moisture-sealed subassembly will be provided. The tubular member 32 will define a chamber 41 for a suitable temperature responsive device described in greater detail hereinafter.

To manufacture the subassembly comprising the heating element 22, the tube 29 and the tubular member 32, they are preferably assembled in the manner indicated in FIG. 10, at which time the end of the tube 29 adjacent the members 22 and 32 may be slightly deformed to close any gap that might exist, whereupon the whole end of the tubular member 29 is brazed as indicated at 33 in FIGS. 11 and 12 to both the tubular member 32 and the heating element 22 thereby providing a completely sealed structure.

In order to enclose the heating element 22 completely and further firmly to secure the handle portion 29 and the associated subassembly, best shown in FIGS. 10 and 11, the pan 30 referred to above preferably is somewhat smaller in area than the bottom 21b of the vessel 21 but large enough to enclose the heating element 22 completely. Moreover, as illustrated, it comprises a shallow pan of a depth sufficient to just accommodate the heating element 22. The pan 30 is provided with a laterally extending flange 30a around the periphery thereof for securing the same to the bottom of the vessel 21. To accommodate the tube 32 and the handle portion 29, this pan 30 also has a central depressed portion 30b preferably shaped to conform to the exterior of the tubular member 32 and the handle 29, both of which are slightly greater in thickness than the heating element 22. The subassembly comprising the handle portion 29, the heating element 22 and the tubular member 32 are then brazed to the pan or vessel 21. Simultaneously, the pan 30 is also brazed or otherwise suitably secured thereto. Preferably the vessel 21, the above-mentioned subassembly and the pan 30 are all prepared for brazing and placed within a suitable oven or the like so that the entire unit becomes an integral structure with the heating element 22 in intimate heat exchange relationship with the bottom 21b of the vessel 21, and with the pan 30 forming a smooth bottom also sealed to the vessel 21 all along the peripheral flange 30a. Actually, the pan 30 is provided with a suitable opening 30c for receiving the handle portion 29 and the junction between the two is also sealed.

It will be appreciated that the bottom of the cooking vessel or frying pan 20 of the type described above will reach relatively high temperatures which may be over 400° F. for certain cooking operations and means must be provided to support the vessel 21 from any suitable surface. With ordinary frying pans which are placed over an electric or gas plate, it is desirable to have the bottom of the pan as close to the source of heat as possible. Hence, no supporting means other than the bottom of the pan are provided. With the present invention, however, the frying pan may be supported on any surface including a table or counter, and it is essential that the surface upon which it is supported will not be injured by the high temperatures to which the bottom of the pan may be subjected. Accordingly, there are provided a plurality of feet generally designated by the reference numeral 34, as best shown in FIG. 3 of the drawings. Preferably, the feet are substantially identical with those disclosed and claimed in the copending Jepson application referred to above. As illustrated, each of the feet 34 essentially comprises a multipart foot including a somewhat conically shaped element 35 defining the portion of the foot engageable with the supporting surface. For this reason each portion 35 is preferably formed of molded insulating material or the like. To reduce the heat transfer from the bottom of the vessel 21, and specifically from the pan portion 30 to the insulating members 35, each of the feet 34 comprises a cup-shaped element 36 preferably formed of a relatively poor conductor of heat such as stainless steel or the like. One of the feet 34 is provided at each corner of the pan, and preferably a circular ring or shoulder 30d is defined at each corner of the pan 30 during the initial stamping operation to position the cup-shaped elements 36 therein.

For the purpose of firmly securing the legs 34 to the pan, a suitable nut such as 38 is preferably brazed, welded or otherwise secured to the pan 30 at the center of the circular deformation 30d at each corner thereof, and a fastening means in the form of a screw 39 is adapted to extend through the elements 35 and 36 to secure the same in position. Preferably, the insulating member 35 is provided with a recess 35a to receive the head of the fastening means 39 so that it will be substantially removed from the supporting surface. If desired, this fastening means 39 may also be formed of a material which is a relatively poor conductor of heat. Additionally, the metal elements 36 may be formed of relatively thin material so as to conduct very little heat, and also the area of contact between the insulating members 35 and the cup-shaped elements 36 may be maintained at a minimum to reduce the heat transfer. With this arrangement the cooking vessel 21 is provided with a plurality of feet to support the same above any surface in an insulated manner with a minimum of heat being transferred through the cup-shaped elements 36. Since the frying pan of the present invention can be completely immersed in water for cleaning purposes, there is the problem of preventing water from accumulating within the cup-shaped elements 36. To this end no attempt is made to prevent the water from entering, but, instead, a plurality of slits 40 are provided in the cup-shaped elements which provide openings through which any water that might accumulate therein can escape. This construction is substantially identical with that in the above-mentioned Jepson copending application.

To maintain any selected temperature of the bottom of the vessel 21, it is necessary to employ a temperature responsive device of some sort. So that there will be no moving elements such as switch contacts or bimetallic elements anywhere near the vessel 21, there is employed a temperature responsive device of the type relying on the expansion of a fluid with temperature. In the disclosed embodiment all switch and control means are hermetically sealed within a container with no moving parts extending through the walls of the hermetically sealed container so that no possibility of air or other gas or liquid entering the same can occur. To this end there is disposed within the chamber 41 defined within the tubular member 32 a bulb 42 connected by a capillary tube 43 with suitable control means extending beyond the end of the tubular member 29 remote from the vessel 21. As best shown in FIGS. 4 to 8, inclusive, of the drawings, the end of the tubular handle portion 29 remote from the vessel 21 is sealed to a metal container 44 of somewhat rectangular configuration which defines a control chamber 45. In accordance with the present invention, no movable elements extend through the walls of the container 44 so that no sealing problem is involved, and a completely sealed construction for the chamber 41, the chamber 45 and the passageway within the handle portion 29 interconnecting these chambers is provided. As illustrated in FIGS. 4 and 5 of the drawings, the housing or container 45 is preferably formed of metal and is an elongated chamber with its longitudinal axis extending substantially parallel with the longitudinal axis of the handle portion 29. The end of the container 44 adjacent vessel 21 is provided with an opening to receive therein the end of the handle 29 and the junction between the two is hermetically sealed as by welding, brazing or the like. This provides the completely sealed construction extending from the chamber 41 through the tubular handle 29 and to the chamber 45. The end of the chamber 45 remote from the handle 29 is closed by a suitable cover 47, indicated as a cup-shaped cover having a peripheral flange snugly fitting within the open end of the housing or container 44. As will be described hereinafter, this cover is provided with sealed openings through which certain electrical conductors extend. This cover is put into position during the final assembly operation and is soldered into position to provide an hermetically sealed chamber. In the event that it is ever necessary to disassemble the frying pan for any repair work or the like, the solder seal between the cover 47 and the container 44 must be rendered ineffective so that the cover can readily be removed to afford access to the mechanism contained within the chamber 45.

In order that the expansible fluid contained within the bulb 42 and the capillary tube 43 may perform a control operation in response to changes in temperature of the cooking surface 21b of the vessel 21, the capillary tube 43 is connected to a suitable expansible bellows 49. As illustrated in the drawings, there is provided a suitable bushing or support 50 which is staked or otherwise secured to a removable support 51. The bushing 50 includes a pair of interconnected passageways 52 and 53, the passageway 52 being an extension of the capillary tube 43, and the passageway 53 being connected with the chamber 54 defined within the expansible bellows 49. The bellows 49 essentially comprises a pair of nested flexible wall members 55a and 55b having annular corrugations, and which wall members or walls flex in response to a change in volume of the fluid contained within the bulb 42. The wall portion 55b has a central opening for receiving the bushing 50, which has a shoulder sealed to the edges of this opening. The peripheral edges of the wall portions 55a and 55b are sealed as indicated in the drawings. It will be apparent, therefore, that there has been provided a completely sealed chamber for the expansible fluid, which chamber includes the bulb 42, the capillary tube 43 and the chamber 54 defined within the bellows 49.

It will be appreciated that numerous fluids may be employed within the bulb 42. Preferably a fluid having a boiling point above 450° F. may be employed. Suitable substances for this purpose might be butyl oxalate, diamyl phthalate, a chlorinated biphenyl, or diethyl phthalate. As the temperature of the vessel 21 increases, obviously the fluid within the bulb 42 will expand in volume, particularly as it is converted to a vapor, and it will cause flexing movement of the flexible wall portions 55a and 55b to perform a suitable control operation which will be described in greater detail hereinafter.

The conventional way of controlling the heating of an electric heating element such as 22 in order to maintain the temperature of the vessel 21 constant is to provide switch means in the electrical circuit supplying energy to the heating element, which switch means is controlled in response to the temperature of the bottom of the vessel. To this end the movement of flexible wall member 55a is utilized to control a pair of relatively movable contacts connected in an electrical circuit supplying energy to the heating element 22. Accordingly, there is provided an electric switch generally designated at 60 comprising a pair of relatively movable contacts 61 and 62. The contact 61 may be designated as a stationary contact, although it is selectively adjustable to change the temperature setting for the cooking vessel 21, as will become apparent from the following description. The contact 62 may be considered the movable contact, since it is moved in response to movement of the flexible diaphragm 55a of the expansible bellows 49.

For the purpose of supporting the switch 60 appropriately within the chamber 45, there is provided a switch assembly including, in addition to the relatively movable contacts 61 and 62, a pair of snap-acting leaf members 63 and 64, respectively, each having the configuration of the member 63, best shown in FIG. 5 of the drawings. Each of these members has a U-shaped slot 65 cut therein so as to define a movable tongue 63a or 64a, as the case may be. At the end of the movable tongue 63a is mounted the contact 61, while at the end of the movable tongue 64a is mounted the contact 62, these contacts being on adjacent faces of the tongues when the switch leaves are superimposed one above the other, as indicated in FIG. 4 of the drawings. Each of these switch leaves is provided with an extension designated as 63b and 64b, respectively, which are mounted in a stack of interposed insulating and conducting members, the entire stack being fixed to a raised projection 51a of the support 51 and secured thereto by suitable fastening means comprising the screws 68. As illustrated, this stack comprises an insulating member 69 immediately in contact with the extension 51a of the support. Above that is a conductor member 70 having a male type bayonet extension 70a extending beyond the stack for making electrical connection with a suitable external circuit to be described hereinafter. Superimposed on the conductor member 70 is an insulating member 71, and above the insulating member 71 is the portion 64b of the switch leaf 64. Interposed between the switch leaf portions 63b and 64b, respectively, is an insulating member 72, while above the switch leaf 63, and specifically the portion 63b thereof, is a conducting member 74 having a laterally projecting conducting tab 74a so that electrical connection can be made to the switch leaf 63. The switch leaf 64a is also provided with a projecting conducting tab 64c extending parallel with and to one side of the similar conducting tab 70a. This tab 64c is also slightly above the tab 70a, and together these tabs provide a male type multi-circuit bayonet connector. This stack of superimposed elements makes the assembly for the switch 60 an integral part of the support 51 which also supports the bellows element 49.

To electrically connect the heating element 22 with the switch assembly 60, there are provided a pair of conductors designated at 78 and 79, respectively, which extend within the tubular conduit 29. The conductor 78 is illustrated as being electrically connected to the terminal 27 of the heating element 22, while the conductor 79 is illustrated as being electrically connected to the terminal 28 of the heating element 22. These conductors 78 and 79 extend into the sealed chamber 45, and the conductor 78 is electrically connected to the tab 74a as by soldering or the like, as is clearly shown in FIG. 5 of the drawings. Similarly, the conductor 79 is connected to the tab 70a.

It will be apparent that with this arrangement an electrical circuit is provided from the terminals 70a and 64c through the switch comprising the contacts 61 and 62 shown in the closed position in FIGS. 4 and 13 of the drawings, and the open position in FIG. 8 of the drawings. To complete the electrical circuit outside the sealed chamber 45, whereby the electric heating element 22 may be connected to a suitable source of electrical energy, the cover 47 for the sealed chamber 45 is provided with a pair of openings disposed in spaced relationship to receive a pair of contact terminals 81 and 82, respectively. These contact terminals are suitably secured to female type bayonet connectors 83 and 84, respectively, the connector 83 being inverted with respect to the connector 84 so that the contact 83 may engage the tab 64c, which, as was mentioned above, is disposed slightly above the level of the tab 70a, and the female type bayonet connector 84 may engage the male type tab 70a. In this way the terminal pins 81 and 82 may be disposed in spaced parallel relationship and on a common horizontal plane.

To provide a suitable seal at the point where the pin terminals 81 and 82 extend through the openings in the cover 47, suitable glass sealing means are preferably provided which are designated by the reference numeral 85. It will be understood that the terminal pins 81 and 82 may be electrically connected to the conventional female type plug commonly used with electrical appliances. With the construction described, it will be apparent that during the assembly operation the cover 47 is moved into place as one of the later steps in the assembly operation, and as it is moved into place the bayonet type contacts are completed, whereupon the cover 47 is soldered in place to provide an hermetically sealed construction. Should any servicing be required, the cover 47 is unsoldered from the container 44 and the bayonet type contacts are released merely by pulling the cover 47 out of position. Thus is provided a very simple construction which insures a completely sealed unit with no movable parts extending outside the sealed structure.

In order for the switch leaves 63 and 64 to provide the desired control function and at the same time to permit the switch 60 to be moved into the container 44 as a unit with the support 51, these leaves are provided on adjacent faces thereof at about the base of the tongues 63a and 64a with insulating buttons 86 and 87 which effectively provide a sort of fulcrum or more or less fixed support for the two switch leaves during operation. To the end of the switch leaf 64 remote from contact 61 is provided an insulating button 88 which engages the flexible wall 55a of the bellows 49. The bellows 49 expands in response to the expansion of the fluid within the bulb 42, which causes upward movement of the center of the bellows both through distortion of the upper wall 55a and also through upward movement of the outer edges of the lower wall 55b, which, upon sufficient movement, causes snap-acting operation of the tongue 64a of the switch leaf 64 with the resultant opening of the switch 60 comprising relatively movable contacts 61 and 62.

In accordance with the present invention, it is essential that the position of contact 61 may be selectively controlled to provide different temperature settings for the cooking vessel of the present invention, and to this end the switch leaf 63 is provided with an insulating button 89 on the upper face thereof as viewed in FIGS. 4 and 8 of the drawings, which is engageable with a flexible wall section 44a of the container 44.

The flexible wall section 44a is preferably formed by annular corrugations defined in a section of housing 44. Thus, by deflecting the wall section 44a, it is possible to transmit movement thereof to the insulating button 89, and hence to the contact 61. This can be accomplished, of course, without any movable member extending through the walls defining chamber 45.

For the purpose of selectively controlling the position of contact 61, and hence for the purpose of selectively controlling the temperature of the cooking vessel 21, there is provided an annular spiderlike support 90, best shown in FIGS. 4, 6 and 9 of the drawings, which includes an annular portion 90a at the outer periphery thereof which is brazed or otherwise secured to the container 44 surrounding the flexible wall section 44a. The member 90 includes a plurality of spokelike members 90c connecting the annular portion 90a with a central portion 90b, which central portion supports a nut 92 having a central threaded opening therein for receiving a threaded rod 93 having a hexagonal head portion 93a to be received within a corresponding shaped recess 94a within a suitable control knob 94. The control knob 94 preferably has a laterally extending flange portion 94b which rides on the annular portion 90a of the spider 90. Preferably, also, this annular portion 94b is provided on the surface engaging the annular portion 90a with a plurality of integral dimples or protrusions 95, best shown in FIGS. 6 and 9 of the drawings, to reduce the friction between the knob 94 and the support 90. It will be apparent that as the knob 94 is rotated, the hexagonal head 93a of the screw 93 which is recessed within the hexagonal opening 94a in the knob 94 will cause the threaded rod 93 to move vertically, depending upon the rotation of the knob 94, thereby selectively to adjust the position of the flexible wall 44a and, consequently, also the position of the contact 61. Preferably, the knob 94 is provided with a knurled or similar finger grip portion 94c and also an angular surface, best shown at 94d in FIG. 8 of the drawings, upon which suitable indicia may be placed to indicate the setting of the knob.

In order that the housewife may carry the cooking vessel 20 around whether hot or cold, there is attached to the tubular handle portion 29 an insulating handle portion generally designated at 97, which is effectively a two-part member comprising an upper part 98 and a lower part 99, both preferably molded of suitable insulating material such as a phenolic resin or the like. The handle parts are molded so as to have suitable cooperating recesses to receive the tubular conduit 29 and the container 44, as well as to receive the terminal pins 81 and 82. Preferably, the handle 97 is provided with a recess 100 at the end adjacent the terminal pins 81 and 82 into which the ends of the terminal pins extend so as to provide the conventional recess for a suitable female type plug connector. Preferably, also, cooperating recesses are provided within the handle portions 98 and 99 to receive suitable insulating sleeves 101 surrounding the terminal pins and suitably supporting and centering them within the cooperating recesses defined within the handle parts 98 and 99.

To insure sufficient strength in the clamping action of the insulating handle portion 97 to the tubular handle portion 29, there is provided a clamp member 105, best shown in FIGS. 4, 5 and 7 of the drawings, which has a central portion 105a conforming to the shape of the lower half of the tubular section 29 and a pair of lateral flanges 105b and 105c which extend into a recess defined within the lower handle part 99 of the handle portion 97. Suitable threaded inserts 107 are preferably molded within the part 98 of the molded handle portion 97 and fastening means 108 and 109 clamp the two handle sections 98 and 99 together. Moreover, the screws 108 clamp the clamping plate 105 into clamping engagement with the tubular handle portion 29 thereby firmly securing the insulating handle section 97 to the tubular handle portion 29.

The insulating handle portion 98 is provided with an opening having an overhanging annular lip 98a whereby the knob 94 may be exposed through the opening and yet held in place by the lip 98a overlying the flanged portion 94b of the knob 94. Actually, the knob 94 is first dropped into the opening with its flange 94b engaging the lip 98a, whereupon the handle part 98 with the knob in position is placed over the handle portion 29 and associated container 44 so that the hexagonal head of the threaded rod 92 is received within the cooperating recess 94a. Then the insulating handle portion 97 is clamped to the tubular handle portion 29, and by virtue of the relatively rectangular or elongated cross section of the tubular handle member 29 a firm grip is provided which will prevent the vessel 21 from turning relative to the handle 97 when gripped by the operator.

As was described above, the switch 60 and the bellows 49 are suitably mounted upon the support 51. Actually, the capillary tube 43 and the bulb 42 are also a part of this subassembly. In order that this entire subassembly comprising the bulb 42, the capillary tube 43, the bellows 49, the switch 60 and the support 51 may be inserted within the chamber 44 as a subassembly and readily be retained therein, this subassembly is adapted to be inserted into position from the end of the housing 44 closed by the cover 47. To firmly secure and support this subassembly within the chamber 45 when it is moved to its proper position, there is preferably secured to the bottom of the housing 44 within the chamber 45 a clamp member or spring clip 110 which is slightly wider than the support 51 and has its outer edges turned back, as indicated at 110a in FIGS. 5 and 6 of the drawings, to provide a sort of guide clamp whereby the support 51 may be gripped by the turned back edges 110a as it is slid into position. Preferably, the clamp member 110 has a pair of laterally extending or projecting ears 110b which hold the conductors 78 and 79 out of the way toward the sides of the rectangular chamber member 44 so as not to interfere with movement of the subassembly into position, and specifically with movement of the support 51 into the clamp 110. To position the subassembly properly, the support 51 widens out at the end adjacent the raised portion 51a so as to provide definite stops designated as 51b on either side thereof, best shown in FIG. 5 of the drawings, to engage with the clamp 110 and thereby limit the maximum insertion of the support 51 within the clamp 110. This position will insure that the insulating button 89 will be directly beneath the threaded rod 93 so that movement of the former can be obtained through flexing of the wall portion 44a of the housing 44.

In the assembly of the present invention, it will be understood that before the pan 30, the tubular member 32, the heating element 22 and the tubular handle portion 29 are united as a subassembly, the conductors 78 and 79 will be suitably connected to the terminals 27 and 28, respectively, in the manner indicated in FIG. 2 of the drawings. These conductors will extend out of the end of tubular member 29 to which the container or housing 44 is subsequently secured. After this the subassembly 30–32–22–29 is brazed to the vessel 21, at which time there is provided an assembly which has the conductors 78 and 79 protruding from the end of the handle portion 29 remote from the vessel 21. Thereafter the housing 44 to which the clamp 110 and the spider 90 have been properly assembled is secured to the free end of the tubular member 29 as by brazing or welding in the manner shown in FIG. 5 of the drawings. In the meantime, there has been prepared a subassembly comprising the support 51 to which are secured the bellows 49 and the associated capillary tube 43 and bulb 42, as well as the switch assembly 60. This subassembly is inserted into the open end of the container 44 defining the chamber 45 so that the bulb 42 moves down into the chamber 41 and the support 51 is firmly secured by the clamp 110. The conductors 78 and 79 are then suitably connected to the terminals 74a and 70a, respectively, after which the cover 47 is moved into place with the terminals 81 and 82 suitably sealed thereto. The bayonet connections are completed and the cover 47 is soldered to provide a completely sealed construction. Thereafter the insulating handle 97 including the clamp 105 together with the knob 94 are assembled to complete the construction.

Preferably, the insulating handle portion 97 is molded so as to have an upper configuration terminating in a somewhat pointed portion 97a which extends adjacent the indicia on the portion 94d of the knob 94. This pointed portion 97a then becomes a suitable index to indicate the knob settings which preferably include an off indication and temperature indications of the particular settings of the knob. As is also disclosed in the copending Jepson application referred to above, the handle 97 preferably includes a portion 97b on the upper surface thereof adjacent the knob 94 which comprises a cook guide setting forth various materials to be cooked by the cooking vessel 20 together with the temperature setting which is recommended for such cooking operation. In a simple manner, therefore, the housewife may merely set the knob 94 to any setting as indicated by the cook guide 97b in dependence upon the particular food to be cooked, and the cooking vessel will then be accurately maintained at this selected temperature.

From the above description it will be apparent that there has been provided a cooking vessel, and specifically a frying pan which is completely controlled to give any desired temperature and maintain the same throughout the cooking area, and which has no moving elements that are not hermetically sealed within the vessel or a chamber associated therewith. Thus, the vessel may be completely immersed in water including the handle thereof, and it is impossible for any liquid to enter any part thereof since all moving parts which could be damaged are completely sealed. In view of the detailed description included above, the operation of the frying pan and associated mechanism will readily be understood by those skilled in the art and no further discussion thereof will be included herewith.

Although from the above description there has been illustrated a cooking vessel or frying pan which may be constructed primarily from metal stampings and the like, it should be understood that the vessel and the heating element may be cast of aluminum, as in the above-mentioned copending Jepson application, and such modified construction is shown in FIG. 14 of the drawings. Instead of employing a singular tubular member such as 29, a plurality of tubes, three being shown in FIG. 14 of the drawings, are employed, designated as 115, 116 and 117. The corresponding parts of FIG. 14 are designated by the same reference numerals as in the preceding embodiment. In the arrangement of FIG. 14, the handle 97 may be secured to the three tubular members 115, 116 and 117 which have been brazed or otherwise secured to the container 44 to provide the sealed construction. It will be understood that the tube 116 will be closed at the lower end to define the same sort of bulb receiving chamber 41 as in the preceding embodiment to receive the bulb 43. With the conductors 78 and 79 in tubes 115 and 117, respectively, and connected to the terminals 27 and 28 of the heating element 22, the vessel designated as 118 in FIG. 14 of the drawings is cast so that the tubes 115, 116 and 117 are completely embedded therein as is also the heating element 22.

By virtue of the completely sealed construction of the operating mechanism including the movable contacts, which sealed construction is hermetically sealed and does not depend upon gaskets or the like, it is possible completely to immerse in cleaning liquid not only the vessel itself but the handle as well. In FIG. 15 of the drawings, there is illustrated a cooking vessel embodying a modification of the present invention in which the handle is removable from the vessel so that it never need be inserted in liquid for cleaning purposes, whereupon the remainder of the vessel including the associated heating element and the like may readily be immersed for cleaning purposes.

As illustrated in FIG. 15 of the drawings, there is disclosed a frying pan or cooking unit 120 comprising the vessel 121, which may be very similar to vessel 21 previously described. As illustrated, this vessel has a rolled rim 121a, a peripheral side wall 121c, and a bottom 121b corresponding to similar parts in the frying pan 20 described above. As illustrated in FIG. 15, there is provided a heating element 122 which essentially comprises two separate sections 122a and 122b which are suitably secured to the bottom 121b in intimate heat exchange relationship therewith. Each of these heating elements has a short of serpentine configuration at the center, with the ends thereof disposed in colinear relationship but extending in opposite directions. The two ends of each heating element section 122a and 122b terminate in electrical terminals, and the terminals at the corresponding ends of sections 122a and 122b, as viewed in FIG. 15 of the drawings, are disposed in spaced parallel relationship. As illustrated, the heating element 122a is provided with end terminals 123 and 124, while the heating element 122b has end terminals 125 and 126. The spacing between the terminals 123 and 125 is such that these terminals effectively comprise male type terminal pins for making electrical connection with the conventional female type plug connector as shown at 127, which is connected to a suitable power cord 128 for connection to a suitable source of electric power. Preferably the vessel 121 is provided with a suitable plug recess 130 within which the terminal pins 123 and 125 extend. The heating element 122 is preferably of the same sheathed type described above, and to insure a water-sealed construction, suitable glass seals such as indicated at 131 are provided at the ends adjacent the terminals 123 and 125, and similarly, at the ends adjacent the terminals 124 and 126. The portions of the heating element 122 adjacent the terminals 124 and 126 extend in closely spaced parallel relationship projecting somewhat beyond the confines of the vessel 121 in the direction of the handle. In accordance with the present invention, the vessel 121 is provided with a suitable bore 134 which extends between the parallel ends of the heating element terminating in terminals 124 and 126, and hence more or less bisects the vessel 121, as is clearly apparent from FIG. 15 of the drawings. This bore is adapted to receive a suitable metal housing 135 which is firmly secured in a suitable handle 136 as, for example, the handle 136 being molded around the housing or tubular member 135 so that the tubular member 135 extends beyond the end of the handle 136 attached thereto. The end of the member 135 insertable into the bore 134 is closed to define a closed chamber therein. Suitably supported within the handle 136 are a pair of electrical connectors 138 and 139 which are mounted in a suitable recess for making electrical connection with the terminals 124 and 126. The handle 136 may be readily removed from the vessel 121 by merely pulling it away from the vessel so that the contacts 124 and 126 are electrically disconnected from the contacts 138 and 139, and, simultaneously, the tube 135 is moved out of the bore 134. Actually the tube 135 fits snugly wtihin the bore 134 firmly to connect the handle 136 to the vessel 121. Moreover, the ends of the heating elements 122a and 122b extending into cooperating openings in the handle 136 prevent any relative rotation between the handle 136 and the vessel 121.

As in the preceding embodiment, there is associated with the handle a suitable bulb 42 and capillary tube 43 which connects the bulb to an expansible bellows 140. The bulb 42 extends within a chamber defined by the tubular member 135 so that when the handle is associated with the vessel 121, this bulb 42 is in intimate heat exchange relationship with the vessel, and, hence, will be responsive to the temperature of the cooking surface in the vessel.

The electrical circuit in FIG. 15 has been more or less schematically indicated and may be very similar to that described in connection with the cooking vessel 20. However, since the handle 136 is completely removable from the vessel, it becomes unnecessary to have the completely sealed construction described above, since the handle may be removed when it is desired to wash the vessel 121. However, as illustrated, there is provided a suitable switch generally designated at 141 comprising relatively movable contacts 142 and 143. The contact 143 is operated in response to movement of the bellows 140 to open the switch in response to expansion of the bellows. An electrical circuit comprising a conductor 144 connects the contact 138 with the contact 142, while a conductor 145 connects the contact 139 with the contact 143. It will be understood that a control means such as a knob 94 described above will be provided on the handle 136 selectively to control the position of the contact 142 and, hence, selectively to control the temperature. The switch 141 may have various constructions and the particular embodiment shown is merely by way of example. If desired, a suitable safety feature may be incorporated whereupon before the contacts 138 and 139 are disconnected from the terminal pins 124 and 126, respectively, the circuit will be interrupted at the switch contacts 142 and 143, thus preventing one from drawing an arc at the terminals 124 and 126 in the event that power should be supplied to the terminals 123 and 125 when the handle is removed from the vessel. It will be appreciated that when employing the male type contacts 124 and 126 the handle must not be removed without disconnecting the plug connector 127. It will be understood, however, that to prevent any danger to the operator should any such instruction be violated, the terminals 124 and 126 may be made as female type contacts with the male type contacts disposed within the handle 136, in which case the handle can be removed regardless of whether or not power is applied to the terminals 123 and 125.

In view of the detailed description included above, the operation of the cooking vessel 120 will readily be understood. Whenever the cooking operation is completed and it is desired to clean the vessel 121, the handle 136 is removed, which removes the thermoresponsive bulb 42 disposed within the tube 135 and by virtue of the sealed ends of the sheathed heating element sections 122a and 122b the vessel 121 may be immersed for washing purposes without any problem whatever. This construction has another advantageous feature in that the vessel may be washed in a dishwasher where relatively high water temperatures are employed, which might damage a handle made of insulating material if it were attached to the cooking vessel during the washing operation.

It will be understood that the vessel 121 may be made as a casting, in which case the means defining the bore 134 will be cast during the casting operation. On the other hand the vessel 121 may be made of metal stampings, in which case a tubular member defining the bore 134 will be brazed or otherwise secured to the vessel 121 in the same manner as certain members were secured to the vessel 20 described above.

A housewife might have a plurality of cooking units 120 except that the shape of the vessel 121 might vary. For example, she might have the frying pan 120 and a plurality of saucepans all embodying the features of the specific cooking unit 120 shown in FIG. 15 with the removable handle. In such case, these units could all be designed with the identical handle assembly, so that the housewife might require only a few handles interchangeable with all the vessels, thus providing a large variety of cooking units with a minimum of expense.

While there have been illustrated and described several embodiments of the present invention, it will be understood that numerous changes and modifications will occur to those skilled in the art, and it is intended in the appended claims to cover all such changes and modifications as fall within the true spirit and scope of the present invention.

What is claimed as new and desired to be secured by Letters Patent of the United States is:

1. In an electric frying pan, the combination of an open top vessel, an electric heating element secured to said vessel and disposed in intimate heat exchange relationship with the bottom of said vessel, means defining an elongated hermetically sealed chamber having one end thereof secured to said vessel and extending laterally therefrom, control means disposed in said chamber and connected to said electric heating element, said electric heating element and said control means being completely sealed against the entrance of moisture, and an insulating member secured to and enclosing a portion of said first mentioned means remote from said vessel thereby to define a handle for said vessel.

2. A cooking vessel comprising a container, an electric heating element secured to the bottom of said container, an elongated means defining therein a hermetically sealed chamber, said elongated means having one end secured to said container and extending laterally therefrom, a portion of said elongated means engaging the bottom of said container, an insulating member enclosing a portion of said elongated means remote from said container thereby to provide a handle for said container, a panlike member secured to the bottom of said container and enclosing said heating element and said portion of said elongated means, and temperature responsive control means disposed in said chamber and operatively connected for selectively controlling said heating means.

3. In an electric cooking vessel, the combination of a container having a portion defining a flat cooking surface, electric heating means disposed in intimate heat exchange relationship with said portion, metallic means defining a chamber in intimate heat exchange relationship with said portion, a thermal responsive device of the expansible fluid type including a bulb portion disposed in said chamber so as to be responsive to the temperature of said cooking surface, a handle secured to said container, said thermal responsive device including an expansible bellows disposed in said handle, and a capillary tube interconecting said bulb and said bellows.

4. In an electric cooking vessel, the combination of a container, an electric heating element secured to the bottom of said container in intimate heat exchange relationship therewith, an elongated means defining an hermetically sealed chamber having one end secured to said container and extending laterally therefrom, a portion of said elongated means engaging the bottom of said container, terminals connected to said electric heating element extending into said chamber in sealed relationship therewith, a pair of circuit conductors extending into said chamber in sealed relationship therewith, circuit means including a control switch disposed in said chamber interconnecting said terminals and said conductors, thermal responsive control means disposed in said chamber having a heat responsive portion thereof disposed in the chamber portion defined by the portion of said elongated means engaging the bottom of said container, so as to respond to the temperature of the bottom of said container, means operatively connecting said thermal responsive means and said control switch, and means disposed outside said sealed chamber operatively connected to said thermal responsive control means for selectively adusting thje temperature at which said switch is operated by said thermal responsive means to control the temperature of the bottom of said container.

5. The cooking vessel of claim 4 wherein said means disposed outside said sealed chamber has no movable means extending through the walls defining said chamber.

6. The cooking vessel of claim 4 wherein said means defining a sealed chamber includes a flexible wall section whereby said means disposed outside said sealed chamber by movement of said flexible wall section selectively controls the operation of said control switch.

7. An electric cooking vessel comprising a container, an electric heating element secured to the bottom of said container in intimate heat exchange relationship therewith, an elongated means defining a sealed chamber therein having one end secured to said container and extending laterally therefrom, a portion of said elongated means engaging the bottom of said container, terminals for said electric heating element extending into said chamber in completely sealed relationship therewith, a pair of circuit conductors extending into said chamber in sealed relationship therewith, circuit means including a control switch disposed in said chamber interconnecting said terminals and said conductors, thermal responsive control means of the expansible fluid type disposed in said chamber having a bulb disposed in the portion of said chamber defined by the portion of said elongated means engaging the bottom of said container so as to respond to the temperature of the bottom of said container, an expansible bellows connected to said bulb, means operatively interconnecting said bellows and said control switch, means for operating said control switch in response to the expansion and contraction of said bellows, and means disposed outside said sealed chamber for selectively adjusting the effective temperature at which said bellows operates said switch thereby selectively controlling the temperature of the bottom of said container.

8. A cooking vessel comprising a container, an electric heating element secured to the bottom of said container in intimate heat exchange relationship therewith, an elongated means defining an hermetically sealed chamber therein having one end secured to said container and extending laterally therefrom, a portion of said elongated means engaging the bottom of said container, a removable closure for the end of said elongated means remote from said one end, a thermal responsive device including a control switch, an expansible bellows and a fluid containing bulb connected to said bellows by a capillary tube disposed in said chamber with said control switch connected in circuit with said electric heating element, said bulb being disposed in the portion of said chamber defined by the portion of said elongated member engaging the bottom of said container, and means for selectively adjusting said switch from outside said chamber.

9. The cooking vessel of claim 8 wherein said elongated chamber is provided with means including a deformable wall section adjacent said control switch whereby said control switch may be selectively adjusted from outside said chamber.

10. In an electrically heated cooking vessel, the combination of a container, the bottom of said container having an elongated passageway extending therealong, electrical heating means on the bottom of said container, a hollow handle removably secured to said container aligned with said passageway and forming an extension thereof, elongated heat responsive means in thermal contact with the walls of said passageway, said thermal responsive means extending into said hollow handle, control means in said handle operable by said heat responsive means for controlling said heating means, and means operable from the exterior of said handle for adjusting said heat responsive means.

11. An electrically heated cooking vessel comprising, a metal container having a heating surface defined on the bottom portion thereof, an elongated electrical resistance heater extending along and in intimate heat exchange relationship with said bottom portion, a metal tube integral with said bottom portion, a hollow handle secured to said container in alignment with said tube, heat responsive heater control means including a tubular member fitting into said tube in intimate heat exchange relationship, and means supported by said handle operatively connected to said heat responsive means for controlling said heater.

12. In an electrically heated cooking vessel, a pan, an elongated electrical resistance heater in heat conductive relationship with the bottom thereof and having ends positioned near one another, a heat conductive metal tube mounted in a position extending along the bottom of said pan and in contact therewith and having one end closed and the other end open, said other end of said tube being positioned adjacent to and between said ends of said heater, hollow handle means having one end receiving said ends of said heater and said other end of said tube, means sealing said end of said handle means to said heater and said tube and securing said handle means rigidly to said pan, whereby said handle means may be used to support said pan, an elongated heat responsive device fitting closely and slidably in said tube and extending from said tube into said handle means, electrical connector means on said handle means, switch means operable by said heat responsive device, and means interconnecting said connector means with said switch means and said ends of said heater.

13. In an electrically heated cooking device, the combination of a container having a bottom defining a cooking surface on one side thereof, electrical heating means in intimate heat exchange relationship with the other side of said bottom, a metal tube secured to said other side of said bottom in intimate heat exchange relationship therewith, a panlike member secured to said other side of said bottom in sealed relationship therewith and enclosing said electrical heating means and said tube, at least the central portion of said panlike member being spaced from said bottom, said heating means including a pair of terminals extending through openings in said panlike member, means defining an opening in said panlike member affording access to one end of said tube, and a temperature sensing element for controlling said electrical heating means having a portion insertible into said one end of said tube in heat exchange relationship with said tube.

14. The cooking device of claim 33 wherein said pair of terminals and tube are in spaced parallel relationship parallel with the bottom of said container and sealing means are provided around the openings in said panlike member through which said terminals extend and also the opening affording access to one end of said tube thereby to prevent the entrance of moisture or the like into the space within said panlike member.

15. The electrically heated cooking device of claim 13 wherein said openings are defined in one side of said panlike member.

16. In an electrically heated cooking vessel, the combination of a container, a heater in heat conducting relationship with the bottom of said container, tubular means for receiving a temperature sensitive element mounted on the bottom of said container, a panlike member having tapped bosslike projections secured to the bottom thereof, said panlike member being secured to the bottom of said container enclosing said heater and said tubular means, a plurality of leg members having tip portions of insulating material, and screw means threaded into said projections for securing said leg members to said panlike member.

17. A cooking vessel having a bottom wall providing a flat cooking surface, said wall having a sleeve structure secured thereto providing an elongated passage generally parallel to said wall with one end of said sleeve having an opening, said sleeve structure being sealed except at said opening, an electric sheathed heater secured to said wall therebeneath, said heater forming a loop on said wall to uniformly heat the latter, said heater having a pair of rigid terminal portions disposed adjacent the open end of said sleeve structure on opposite sides thereof, a handle attached to said vessel and having a passage therein communicating with the elongated passage in the sleeve, said terminal portions extending into said handle, a thermostatic control disposed in said passages and including a temperature responsive device in said elongated passage, a switch in said handle connected in series with said heater and arranged to be actuated by said device and manually adjustable means in the handle for adjusting the temperature of said device at which it actuates the switch, and sealing means about said terminal portions to protect said heater against moisture when said vessel is immersed in water.

18. An electric cooking vessel comprising a container having a portion defining a flat cooking surface, electric heating means disposed in intimate heat exchange relationship with said portion and secured thereto, and a unitary assembly removably associated with said container comprising a thermal responsive device including a temperature responsive member movable into heat exchange relationship with said portion, said unitary assembly comprising a handle for supporting said container including control means responsive to the temperature of said member for selectively controlling the cooking temperature of said electric heating means, said handle being readily removed from or attached to said container.

References Cited

UNITED STATES PATENTS

| | | | |
|---|---|---|---|
| Re. 20,570 | 12/1937 | Bushway | 219—43 X |
| 1,662,817 | 3/1928 | Bollmann et al. | 200—136.5 |
| 1,813,267 | 7/1931 | Arnesen | 200—136.5 |
| 2,682,589 | 6/1954 | Dillon | 200—139 |
| 2,744,995 | 5/1956 | Jepson | 219—441 |
| 1,431,542 | 10/1922 | Ross | 200—136.5 |
| 1,681,099 | 8/1928 | Clark | 219—441 |
| 2,530,643 | 11/1950 | Berg et al. | 219—450 |
| 2,571,782 | 10/1951 | Swenson | 219—441 X |
| 3,095,498 | 6/1963 | Foster | 219—441 |
| 1,629,737 | 5/1927 | Rohne | 219—436 |
| 2,215,929 | 9/1940 | Husk | 219—43 XR |
| 2,232,998 | 2/1941 | Cernohooz | 219—472 X |
| 2,571,782 | 10/1951 | Swenson | 219—440 |

FOREIGN PATENTS

| | | |
|---|---|---|
| 664,113 | 1/1952 | Great Britain. |
| 424,247 | 5/1933 | Great Britain. |
| 427,800 | 4/1935 | Great Britain. |
| 725,341 | 3/1955 | Great Britain. |

ANTHONY BARTIS, *Primary Examiner.*

MAX L. LEVY, RICHARD M. WOOD, *Examiners.*

L. J. LEONNIG, *Assistant Examiner.*